United States Patent
Discekici et al.

(10) Patent No.: US 12,448,538 B2
(45) Date of Patent: Oct. 21, 2025

(54) THREE-DIMENSIONAL PRINTING KITS

(71) Applicant: PERIDOT PRINT LLC, Palo Alto, CA (US)

(72) Inventors: Emre Hiro Discekici, San Diego, CA (US); Greg Scott Long, Corvallis, OR (US); Dennis J. Schissler, San Diego, CA (US); Shannon Reuben Woodruff, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 141 days.

(21) Appl. No.: 18/289,817

(22) PCT Filed: Jun. 2, 2021

(86) PCT No.: PCT/US2021/035359
§ 371 (c)(1),
(2) Date: Nov. 7, 2023

(87) PCT Pub. No.: WO2022/255998
PCT Pub. Date: Dec. 8, 2022

(65) Prior Publication Data
US 2024/0240050 A1 Jul. 18, 2024

(51) Int. Cl.
| | |
|---|---|
| *B33Y 70/00* | (2020.01) |
| *C09D 7/61* | (2018.01) |
| *C09D 7/63* | (2018.01) |
| *C09D 177/04* | (2006.01) |
| *B29C 64/165* | (2017.01) |
| *B29K 21/00* | (2006.01) |
| *B29K 23/00* | (2006.01) |
| *B29K 77/00* | (2006.01) |

(Continued)

(52) U.S. Cl.
CPC ............ *C09D 177/04* (2013.01); *B33Y 70/00* (2014.12); *C09D 7/61* (2018.01); *C09D 7/63* (2018.01); *B29C 64/165* (2017.08); *B29K 2021/003* (2013.01); *B29K 2023/12* (2013.01); *B29K 2077/00* (2013.01); *B29K 2105/251* (2013.01); *B33Y 10/00* (2014.12); *B33Y 30/00* (2014.12); *C08K 3/04* (2013.01); *C08K 5/21* (2013.01)

(58) Field of Classification Search
None
See application file for complete search history.

(56) References Cited

U.S. PATENT DOCUMENTS

| | | | |
|---|---|---|---|
| 2007/0183918 A1 | 8/2007 | Monsheimer et al. | |
| 2015/0344682 A1* | 12/2015 | Ganapathiappan | ... B29C 64/124 522/182 |
| 2017/0312983 A1* | 11/2017 | Birecki | ................. B29C 64/112 |

FOREIGN PATENT DOCUMENTS

| | | |
|---|---|---|
| RU | 2685328 C1 | 4/2019 |
| WO | 2016/072966 A1 | 5/2016 |

(Continued)

*Primary Examiner* — Mohammad M Ameen
(74) *Attorney, Agent, or Firm* — Dierker & Kavanaugh, P.C.

(57) ABSTRACT

A three-dimensional printing kit can include a polymer build material and a fusing agent. The polymer build material can include from about 80 wt % to about 100 wt % polymeric particles. The fusing agent can include an aqueous liquid vehicle, an electromagnetic radiation absorber to absorb radiation energy and convert the radiation energy to heat, and an endothermic decomposition compound that can undergo thermal decomposition at a temperature ranging from about 60° C. to about 400° C.

15 Claims, 3 Drawing Sheets

(51) Int. Cl.
    *B29K 105/00* (2006.01)
    *B33Y 10/00* (2015.01)
    *B33Y 30/00* (2015.01)
    *C08K 3/04* (2006.01)
    *C08K 5/21* (2006.01)

(56) References Cited

FOREIGN PATENT DOCUMENTS

| WO | 2020/251520 A1 | 12/2020 |
| WO | 2020/251543 A1 | 12/2020 |

\* cited by examiner

```
┌─────────────────────────────────────────────────────────────┐
│ Iteratively applying a polymer build material as individual │
│ layers to a powder bed, wherein the polymer build material  │──310
│ includes from about 80 wt% to 100 wt% polymeric particles   │
└─────────────────────────────────────────────────────────────┘
                              │
┌─────────────────────────────────────────────────────────────┐
│ based on a three-dimensional object model, selectively      │
│ applying a fusing agent onto individual layers of the       │
│ polymer build material, the fusing agent including: an      │──320
│ aqueous liquid vehicle, a radiation absorber that absorbs   │
│ radiation energy, and an endothermic compound that          │
│ undergoes thermal decomposition at a temperature ranging    │
│ from about 60 °C to about 400 °C                            │
└─────────────────────────────────────────────────────────────┘
                              │
┌─────────────────────────────────────────────────────────────┐
│ exposing the powder bed to electromagnetic energy to        │
│ selectively heat and fuse portions of individual layers of  │
│ the polymer build material together in contact with the     │──330
│ fusing agent to form a three dimensional object, wherein    │
│ the endothermic decomposition compound causes a structural  │
│ modification of the three-dimensional object in response    │
│ to the heat.                                                │
└─────────────────────────────────────────────────────────────┘
```

THREE-DIMENSIONAL PRINTING KITS

BACKGROUND

Three-dimensional (3D) printing or additive manufacturing are processes used to make three-dimensional solid parts from digital models. 3D printing may be used in rapid product prototyping, mold generation, mold master generation, and short run manufacturing. These techniques are generally additive processes because they involve the application of successive layers of build material. This is unlike other machining processes, which often rely upon the removal of material to create the final part. Some 3D printing methods use chemical binders or adhesives to bind build materials together. Other 3D printing methods involve at least partial sintering, melting, etc., of the build material. For some 3D printing methods, at least partial melting of build material may be accomplished using heat-assisted extrusion, and for some other materials (e.g., polymerizable materials), curing may be accomplished using, for example, ultra-violet light or infrared light.

DETAILED DESCRIPTION

Three-dimensional printing can be an additive process involving the application of successive layers of a polymer build material with a fusing agent printed thereon to bind the successive layers of the polymer build material together. More specifically, in some techniques a fusing agent including an electromagnetic radiation absorber can be selectively applied to a layer of a polymer build material on a support bed, e.g., a build platform supporting polymer build material, to pattern a selected region of a layer of the polymer build material. The layer of the polymer build material can be exposed to electromagnetic radiation, and due to the presence of the electromagnetic radiation absorber on the printed portions, absorbed light energy at those portions of the layer having the fusing agent printed thereon can be converted to thermal energy, thereby causing that portion to melt or coalesce, while other portions of the polymer build material reach temperatures suitable to melt or coalesce. This can then be repeated on a layer-by-layer basis until the three-dimensional object is formed.

In accordance with this, a three-dimensional printing kit (or "kit") can include a polymer build material and a fusing agent. The polymer build material can include from about 80 wt % to 100 wt % polymeric particles. The fusing agent can include an aqueous liquid vehicle, an electromagnetic radiation absorber, and an endothermic decomposition compound. The electromagnetic radiation absorber can absorb radiation energy and convert the radiation energy to heat. The endothermic decomposition compound can undergo thermal decomposition at a temperature ranging from about 60° C. to about 400° C. In some examples, the polymer build material can include at least one of polyamide-6, polyamide-8, polyamide-9, polyamide-11, polyamide-12, polyamide-66, polyamide-612, polyamide-812, polyamide, polyamide thermoplastic elastomer, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, and copolymers thereof. The electromagnetic radiation absorber can include at least one of metal dithiolene complex, carbon black, a near-infrared absorbing dye, a near-infrared absorbing pigment, metal nanoparticles, a conjugated polymer, visible light absorbing dye, or a combination thereof. The endothermic decomposition compound can include at least one of urea, ammonium nitrate, ammonium chloride, calcium carbonate, copper (II) sulfate, copper (II) sulfate pentahydrate, or an admixture thereof. The endothermic decomposition compound can be present at from about 1 wt % to about 50 wt %. In some examples, the three-dimensional printing kit can further include a second fluid agent. The second fluid agent can be selected from a detailing agent, an endothermic fluid agent, or a combination thereof. The detailing agent can include a detailing compound. The detailing compound can reduce the temperature of powder bed material onto which the detailing agent is applied. The endothermic fluid agent can include an endothermic decomposition agent and an aqueous liquid vehicle and can allow for a structural change in a three-dimensional object formed where the endothermic fluid agent is applied.

In the present disclosure, methods of three-dimensional printing (or "method") is presented. The method can include iteratively applying a polymer build material as individual layers to a powder bed where the polymer build material can include from about 80 wt % to 100 wt % polymeric particles. The method can further include, based on a three-dimensional object model, selectively applying a fusing agent onto individual layers of the polymer build material. The fusing agent can include an aqueous liquid vehicle, an electromagnetic radiation absorber that absorbs radiation energy, and an endothermic compound that undergoes thermal decomposition at a temperature ranging from about 60° C. to about 400° C. followed by exposing the powder bed to electromagnetic energy to selectively heat and fuse portions of individual layers of the polymer build material together in contact with the fusing agent to form a three dimensional object. The endothermic decomposition compound can cause a structural modification of the three-dimensional object formed in response to a dissipation of the heat. In examples of the present disclosure, the endothermic decomposition compound can include urea, ammonium nitrate, ammonium chloride, calcium carbonate, copper (II) sulfate, copper (II) sulfate pentahydrate, or an admixture thereof. In some examples, the polymeric particles can include a polyamide, a polypropylene, or a combination thereof, and the structural modification can include a modification in high/low hydrogen bonding polymer phases. In other examples, the polymeric particles can include a polyamide thermoplastic elastomer, and the structural modification can include an increase in radius of gyration, lamellar spacing, long period structure of disordered phases, or a combination thereof. In some examples, the fused three-dimensional object can have an increase in elasticity of from about 1.1 times to about 4.4 times greater than a comparative three-dimensional object formed from the polymer build material and the electromagnetic radiation absorber can exclude the endothermic decomposition compound. In some examples, the method can further include selectively jetting a detailing agent onto individual build material layers laterally at a border between a first area where the individual layers of the polymer build material is contacted by the fusing agent and a second area where the individual layers of the polymer build material is not contacted by the fusing agent.

In the present disclosure, a system for three-dimensional printing (or "system") is presented. The system can include a polymer build material, a printhead, and an electromagnetic energy source. The polymer build material can include from about 80 wt % to 100 wt % polymeric particles. The printhead can be fluidly coupled to or fluidly coupleable to the fusing agent to selectively and iteratively eject a fusing agent onto successively placed individual layers of the build material. The fusing agent can include an aqueous liquid vehicle, an electromagnetic radiation absorber to absorb radiation energy and convert the radiation energy to heat, and an endothermic decomposition compound that can undergo thermal decomposition at a temperature ranging from about 60° C. to about 400° C. The electromagnetic energy source can be positioned or positionable to expose the individual layers of the polymer build material to radiation energy to selectively fuse the polymeric particles in contact with the electromagnetic radiation absorber to iteratively form a three-dimensional object and to cause a structural modification of the three-dimensional object formed in response to a reduction in the heat due to the presence of the endothermic decomposition compound. In some examples, the polymer build material can include a polyamide, polypropylene, a polyamide thermoplastic elastomer, or a combination thereof. In another example, the endothermic decomposition compound can include urea, ammonium nitrate, ammonium chloride, calcium carbonate, copper (II) sulfate, copper (II) sulfate pentahydrate, or an admixture thereof.

When discussing the three-dimensional printing kit, method of three-dimensional printing, and/or the system for three-dimensional printing herein, these discussions can be considered applicable to one another whether or not they are explicitly discussed in the context of that example. Thus, for example, when discussing a polymeric build material related to a three-dimensional printing kit, such disclosure is also relevant to and directly supported in the context of the method of three-dimensional printing, the system for three-dimensional printing, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

Figure 1:
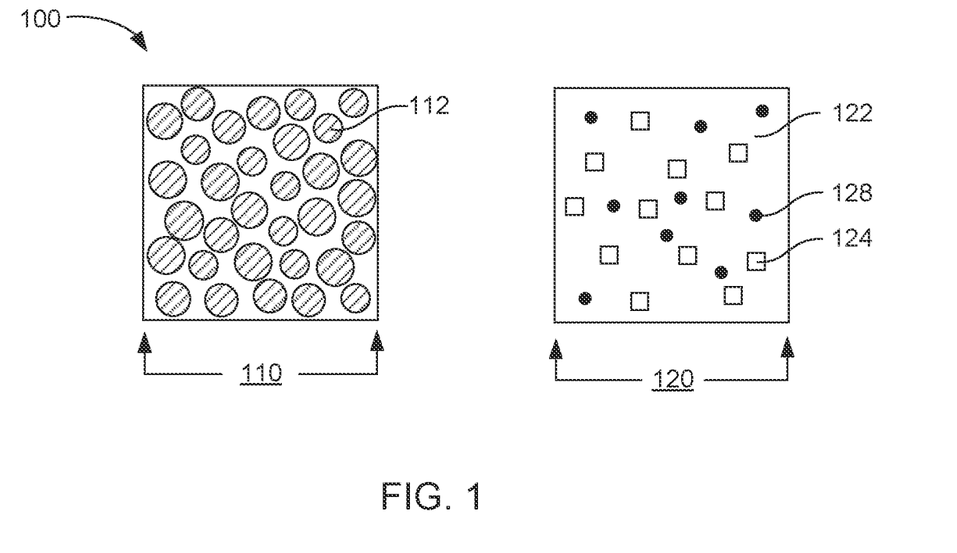
FIG. 1 is a schematic illustration of example three-dimensional printing kits in accordance with the present disclosure.

Three-dimensional printing kits 100 are shown by way of example in FIG. 1. The three-dimensional printing kits can include, for example, a polymer build material 110 and a fusing agent 120. The polymer build material can include from about 80 wt % to 100 wt % polymeric particles 112. The fusing agent can include an aqueous liquid vehicle 122, an electromagnetic radiation absorber 124, and an endothermic decomposition compound 126. The electromagnetic radiation absorber can absorb radiation energy and convert the radiation energy to heat. The endothermic decomposition compound can undergo thermal decomposition at a temperature that can range from about 60° C. to about 400° C.

In some examples, the three-dimensional printing kit can further include other fluids, such as coloring agents, detailing agents, endothermic fluid agents, or the like. A detailing agent, for example, can include a detailing compound which can be a compound that can reduce a temperature of the polymer build material when applied thereto. In some examples, the detailing compound can be water. In some examples, the detailing agent can be applied around edges of the application area of the fusing agent. This can prevent caking around the edges due to heat from the area where the fusing agent was applied. The detailing agent can also be applied in the same area where the fusing agent was applied in order to control the temperature and prevent excessively high temperatures when the polymeric build material is fused. An endothermic fluid agent can include an endothermic decomposition compound and an aqueous liquid vehicle. The endothermic fluid agent can be applied to the area where the fusing agent was applied, e.g. at portions of the polymer build material that make-up individual layers of the three-dimensional printed object. The endothermic decomposition compound can absorb heat in the powder bed.

The polymer build material may be packaged or co-packaged with the fusing agent, coloring agent, detailing agent, endothermic fluid agent, or the like in separate containers, and/or can be combined with the fusing agent, coloring agent, detailing agent, or the like at the time of printing, e.g., loaded together in a three-dimensional printing system.

Systems for Three-Dimensional Printing

Figure 2:
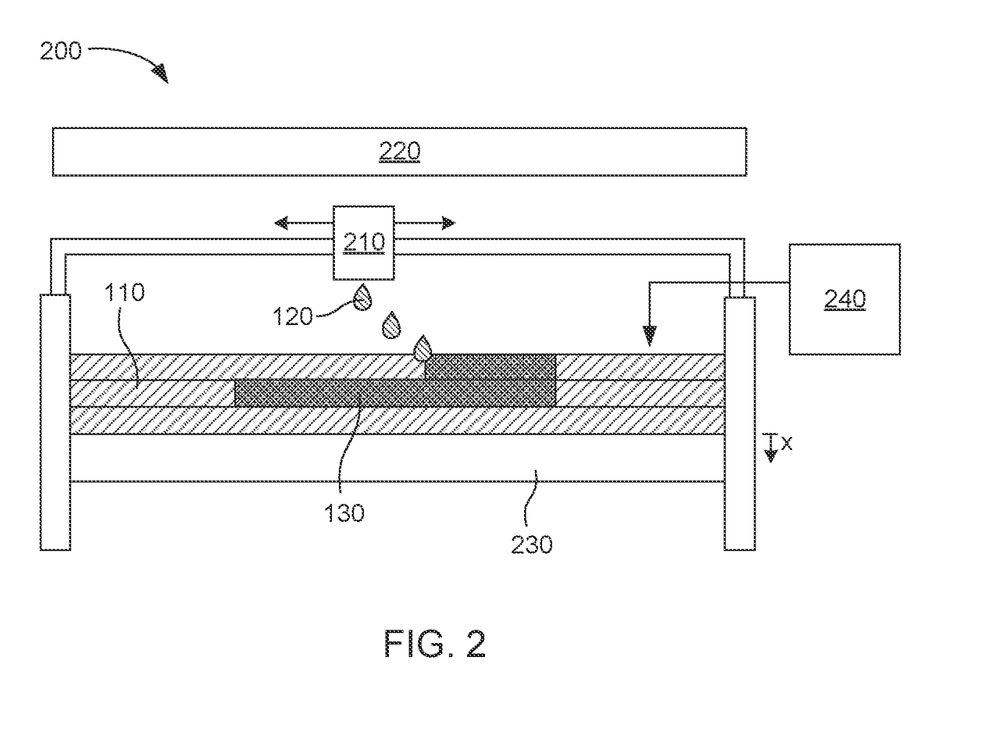
FIG. 2 is a schematic illustration of example three-dimensional printing systems in accordance with the present disclosure.

Also presented herein, is a system for three-dimensional printing 200 as shown in FIG. 2. The system can include a polymer build material 110, a printhead 210, and an electromagnetic energy source 220. The polymer build material can include from about 80 wt % to 100 wt % polymeric particles. The printhead can be coupled to or fluidly coupleable to a fusing agent 120 to selectively and iteratively eject a fusing agent onto successively placed individual layers of the polymer build material. The fusing agent can include an electromagnetic radiation absorber to absorb radiation energy and convert the radiation energy to heat and an endothermic decomposition compound that undergoes thermal decomposition at a temperature ranging from about 60° C. to about 400° C. The electromagnetic energy source can be positioned or is positionable to expose the individual layers of the polymer build material to radiation energy to selectively fuse the polymeric particles in contact with the electromagnetic radiation absorber to iteratively form layers of a three-dimensional object 130 and cause a structural modification of the three-dimensional object in response to the heat due to the presence of the endothermic decomposition compound. In some examples, the system can include the fusing agent, coloring agent, detailing agent, endothermic fluid agent, additional printheads, or combinations thereof. The polymer build material and the fluid agent(s) may be as described in further detail herein.

A printhead, in further detail, can include a fluid ejector operable to selectively deposit jettable fluid(s), such as a fusing agent, coloring agent, detailing agent, endothermic fluid agent, or the like, onto the polymer build material to form individually patterned object layers. Fluid ejector(s) are capable of selectively applying the jettable fluid(s). For example, the printhead can be a digital fluid ejector, such as an inkjet printhead, e.g., a piezo-electric printhead, a thermal printhead, a continuous printhead, etc. The printhead could likewise be a sprayer, a dropper, or other similar structure for applying the fusing agent to the polymer build material.

In some examples, the printhead can be located on a carriage track, but could be supported by any of a number of structures. The printhead may be operable to move back and forth over the polymer build material along the carriage track when positioned over or adjacent to a powder bed of a build platform.

In some examples, the three-dimensional printing system can further include a build platform 230 to support the polymer build material. The build platform can be positioned to permit application of the fusing agent from the printhead onto a layer of the polymer build material. The build platform can be configured, for instance, to drop in height, thus allowing for successive layers of polymer build material to be applied by a supply and/or spreader 240, which may further be included as part of the system. The polymer build material may be layered in the build platform at a thickness that can range from about 5 μm to about 1 cm. In some examples, individual layers applied in the build platform can have a uniform thickness. In some examples, a thickness of a layer of the polymer build material can range from about 10 μm to about 500 μm or from about 100 μm to about 300 μm.

Following the selective application of a fusing agent to the polymer build material, the polymer build material can be exposed to energy from the electromagnetic energy source. The electromagnetic energy source can be an infrared (IR) or near-infrared light source, such as IR or near-IR curing lamps, IR or near-IR light emitting diodes (LED), or lasers with the desirable IR or near-IR electromagnetic wavelengths, and can emit electromagnetic radiation having a wavelength ranging from about 400 nm to about 1 mm. In some examples, the emitted electromagnetic radiation can have a wavelength that can range from about 400 nm to about 2 μm. In some examples, the electromagnetic energy source can be operatively connected to a lamp/laser driver, an input/output temperature controller, and/or temperature sensors. The electromagnetic energy source can be operable to generate a pulse energy that can be sufficient to melt or fuse a portion of the polymer build material, but not so much as to fuse areas that are not first contacted by the fusing agent.

Methods of Three-Dimensional Printing

Figure 3:
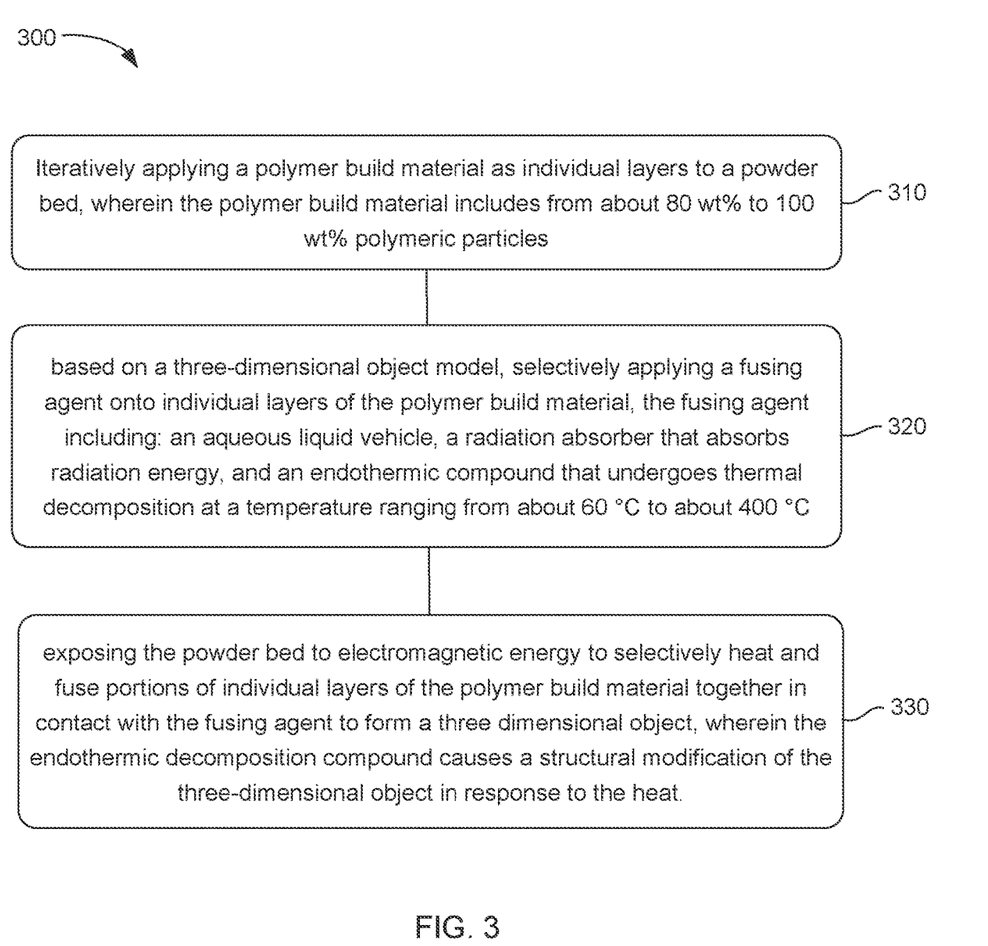
FIG. 3 is a flow diagram illustrating example methods of three-dimensional printing in accordance with the present disclosure.

A flow diagram of example methods 300 of three-dimensional (3D) printing are shown in FIG. 3. The method can include iteratively applying 310 a polymer build material as individual layers to a powder bed. The polymer build material can include from about 80 wt % to 100 wt % polymeric particles. Based on a three-dimensional object model, the method can further include selectively applying 320 a fusing agent onto individual layers of the polymer build material. The fusing agent can include an aqueous liquid vehicle, an electromagnetic radiation absorber that can absorb radiation energy, and an endothermic compound that can undergo thermal decomposition at a temperature that can range from about 60° C. to about 400° C. followed by exposing 330 the powder bed to electromagnetic energy to selectively heat and fuse portions of individual layers of the polymer build material together in contact with the fusing agent to form a three-dimensional object. The endothermic decomposition compound can cause a structural modification of the three-dimensional object formed in response to dissipation of the heat during fusing.

In printing in a layer-by-layer manner, the polymer build material can be spread, a fusing agent applied, the layer of the polymer build material can be exposed to electromagnetic energy, and then a build platform can be dropped a distance of 5 μm to 1 mm, which can correspond to the thickness of a printed layer of the three-dimensional object, so that another layer of the polymer build material can be added again thereon to receive another application of the fusing agent, and so forth. During the build, the electromagnetic radiation absorber in the fusing agent can act to convert the electromagnetic energy to thermal energy and promote the transfer of thermal heat to polymeric particles of the polymer build material in contact with the fusing agent including the electromagnetic radiation absorber. The fusing agent can elevate a temperature of the polymeric particles of the polymer build material above a melting or softening point of the polymeric particles, thereby allowing fusing (e.g., sintering, melting, curing, etc.) of the polymer build material (or polymeric particles thereof) and allowing the formation of an individual layer of the three-dimensional object.

Concurrently, the endothermic decomposition compound in the fusing agent can undergo endothermic decomposition and act as a heat sink to cool the polymeric build material. The endothermic decomposition can have a micro-cooling effect which can result in a structural modification of the polymer particles that form the three-dimensional object. The structural modification is believed to be due to a cooling in the area as the endothermic decomposition compound does not interact directly with the polymeric particles or the polymer build material. In an example, the polymeric particles can include a polyamide, polypropylene, or a combination thereof and the structural modification can include high/low hydrogen bonding polymer phases. Hydrogen bonds occur at a location of an electrostatic attraction between a proton in one molecule and an electronegative atom. Hydrogen bonds can be intermolecular or intramolecular. As used herein, "high/low hydrogen bonding polymer phases" indicates the degree of hydrogen bonding by the specific structural state of the polymer in its condensed state. In some examples, a concentration of 32% (by volume) or higher in the monoclinic alpha structure of the polymer leads to improved properties. In accordance with the present disclosure, three-dimensional objects formed as described herein exhibited a percent volume concentration greater than 32 vol % in the monoclinic alpha structure of the polymer. In some examples, the polymeric particles can include a polyamide thermoplastic elastomer, and the structural modification can include an increase in radius of gyration, lamellar spacing, long period structure of disordered phases, or a combination thereof. As used herein, radius of gyration indicates the distance from the center of mass of a body at which the whole mass could be concentrated without changing its moment of rotational inertia about an axis through the center of mass. Lamellar spacing refers to a separation distance between layers of different polymer domains in lamellar structures. As used herein, "long period structure of disordered phrases" refers to the average stacking period of lamellar structures in the disordered phase of material. The structural modification can include a difference in ductility and an improvement in elasticity as measured using X-ray diffraction. In some examples, the structural modification can result in a fused three-dimensional object that can have an increase in elasticity of from about 1.1 times to about 4 times greater than a comparative three-dimensional object formed from a polymer build material and an electromagnetic radiation absorber which does not include the endothermic decomposition compound. In other examples, the increase in elasticity can be from about 1.1 to about 3 times greater, from about 2 times to about 4 times, or from about 1.5 times to about 5 times greater than a comparative three-dimensional object formed from the polymer build material and the electromagnetic radiation absorber which excludes the endothermic decomposition compound.

The method of layering, selectively applying a fusing agent, and applying electromagnetic radiation can be repeated until all the individual polymer build material layers have been created and a three-dimensional object is formed. In some examples, the method can further include heating the polymer build material prior to dispensing or applying the individual layers of the polymer build material. In some examples, the method can further include heating the polymer build material in the powder bed prior to dispensing or applying the fusing agent thereto.

The fusing agent can be applied such that a specified amount of the electromagnetic radiation absorber is in contact with the polymer build material. Accordingly, in an example, a weight ratio of the polymer build material to the electromagnetic radiation absorber following the selectively applying of the fusing agent onto the polymer build material can range from about 10:1 to about 350:1. In other examples, a weight ratio of the polymer build material to the electromagnetic radiation absorber following the selectively applying of the fusing agent onto the polymer build material can range from about 50:1 to about 250:1, from about 10:1 to about 100:1, from about 100:1 to about 300:1, or from about 150:1 to about 300:1.

In some examples, the method can further include iteratively and selectively dispensing or applying a detailing agent onto an individual polymer build material layer for instance at or near a border between a first area where the individual polymer build material layer was contacted by the fusing agent and a second area where the individual polymer build material layer was not contacted by the fusing agent. The detailing agent can cool the polymer build material and prevent caking around the edges due to heat from the area where the fusing agent was applied. The detailing agent can also be applied in the same area where the fusing agent was applied in order to control the temperature of the polymer build material and prevent excessively high temperatures occurring when the polymer build material is fused.

In further examples, the method can further include iteratively and selectively dispensing or applying an endothermic fluid agent onto an individual polymer build material layer at selected portions or the entire portion where the individual polymer build material layer was contacted by the fusing agent. The endothermic decomposition compound in the endothermic fluid agent can decompose when heated and can cool the polymer build material in the area where the fusing agent was applied.

Polymer Build Materials

The polymer build material can be used as the bulk material of the three-dimensional printed object. As mentioned, the polymer build material can include from about 80 wt % to 100 wt % polymeric particles. In other examples, the polymer build material can include from about 85 wt % to about 95 wt %, from about 90 wt % to 100 wt %, or 100 wt % polymeric particles.

In examples, the polymer build material can include one or more of polyamide-6, polyamide-8, polyamide-9, polyamide-11, polyamide-12, polyamide-66, polyamide-612, polyamide-812, polyamide, polyamide thermoplastic elastomer, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, and copolymers thereof.

The polymer build material may include similarly sized polymeric particles or differently sized polymeric particles. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. Particle size can be reported as a volume equivalent sphere diameter. An average particle size can refer to a mathematical average of the particle sizes. Alternatively, the particle size can be based on a particle size distribution including a D50 particle size, where 50% of the particles are larger than the D50 value and 50% of the particles are smaller than the D50 value. In examples, the polymeric particles can have an average particle size from about 10 μm to about 500 μm, from about 100 μm to about 500 μm, from about 250 μm to about 500 μm, from about 100 μm to about 300 μm, from about 25 μm to about 125 μm, from about 50 μm to about 150 μm, or from about 20 μm to about 80 μm. In another example, the D50 particle size can independently range from about 10 μm to about 150 μm, from about 25 μm to about 125 μm, from about 50 μm to about 150 μm, or from about 20 μm to about 80 μm.

The polymer build material can, in some examples, further include flow additives, antioxidants, inorganic filler, or any combination thereof. Typically, an amount of any of these or other similar components can be at about 5 wt % or less. An example flow additive can include fumed silica. Example antioxidants can include hindered phenols, phosphites, thioethers, hindered amines, and/or the like. Example inorganic fillers can include particles such as alumina, silica, fibers, carbon nanotubes, cellulose, glass beads, glass fibers, and/or the like. Some additives may be found in multiple categories of additives, e.g., fumed silica can be a flow additive as well as a filler. In some examples, the filler or other type of additive can become embedded or composited with the polymer particles in the printed article.

The polymer build material can be capable of being printed into three-dimensional objects with a resolution of from about 10 μm to about 500 μm, from about 20 μm to about 100 μm, from about 50 μm to about 250 μm, from about 250 μm to about 500 μm, or from about 25 μm to about 80 μm. As used herein, "resolution" refers to the size of the smallest feature that can be formed on a three-dimensional object. The polymer build material can form layers from about 10 μm to about 500 μm thick, depending on the size of polymeric particles present in the polymer build material, thus allowing the fused layers of the printed object to have about the same thickness or a few to many times (e.g., 2 to 20 times) greater thickness than the D50 particle size of the polymeric particles, for example. This can provide a resolution in the z-axis direction (e.g., the direction of the buildup of layers) of about 10 μm to about 500 μm. In some examples, however, the polymer build material can also have a sufficiently small particle size and sufficiently uniform particle shape to provide an x-axis and y-axis resolution about the size of the polymeric particle size, e.g., about 2 μm to about 500 μm (e.g., the axes parallel to the support surface of the build platform).

Fusing Agents

The three-dimensional printing kit, system for three-dimensional printing, and method of three-dimensional printing can make use of a fusing agent. The fusing agent can include an aqueous liquid vehicle, an electromagnetic radiation absorber, and an endothermic decomposition compound. In some examples, the fusing agent can further include a dispersant. Dispersants can help disperse the electromagnetic radiation absorber. In some examples, the dispersant itself can also absorb radiation. Other additives may be present as part of the aqueous liquid vehicle, as described more fully below.

The electromagnetic radiation absorber that can absorb radiant energy and convert the energy to heat. The fusing agent can be applied with precision to certain areas of a polymer build material that are desired to form a layer of the final 3D printed object. After applying the fusing agent, the powder bed material can be irradiated with electromagnetic energy. The electromagnetic radiation absorber from the fusing agent can absorb this energy and convert it to heat, thereby heating any polymeric particles in contact with the electromagnetic radiation absorber. An appropriate amount of radiant energy can be applied so that the area of the powder bed material that was printed with the fusing agent heats up enough to melt a portion of the polymeric particles to consolidate the particles into a solid layer, while the powder bed material that was not printed with the fusing agent remains as a loose powder with separate distinct particles.

In some examples, the amount of radiant energy applied, the amount of fusing agent applied to the powder bed, the concentration of electromagnetic radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled to affect the outcome of the 3D printing process.

The electromagnetic radiation absorber, in further detail, can be colored or colorless. In various examples, the electromagnetic radiation absorber can be a pigment, a metal dithiolene complex, a near-infrared absorbing dye, a near-infrared absorbing pigment, metal nanoparticles, a conjugated polymer, a visible light absorbing dye, or combinations thereof. Example pigments can include carbon black pigment, glass fiber, titanium dioxide, clay, mica, talc, barium sulfate, and calcium carbonate. Examples of near-infrared absorbing dyes can include aminium dyes, tetraaryldiamine dyes, cyanine dyes, pthalocyanine dyes, dithiolene dyes, and others. In further examples, the electromagnetic radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the electromagnetic radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. Some non-limiting examples can include $M_2SiO_4$, $M_2Si_2O_6$, and/or other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the electromagnetic radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples can include complexes based on nickel, palladium, and platinum.

A dispersant may be included in the fusing agent. Dispersants can help disperse the radiation absorbing pigments described above. In some examples, the dispersant itself can also absorb radiation. Non-limiting examples of dispersants that can be included as an electromagnetic radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctylphenyl ether, sodium polyacrylate, and combinations thereof.

The amount of electromagnetic radiation absorber in the fusing agent can vary depending on the type of electromagnetic radiation absorber. In some examples, the concentration of electromagnetic radiation absorber in the fusing agent can be from about 0.1 wt % to about 20 wt %. In some examples, the concentration of electromagnetic radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In some examples, the electromagnetic radiation absorber can have a concentration in the fusing agent such that after the fusing agent is jetted onto the polymer build material, the amount of electromagnetic radiation absorber in the polymer build material can be from about 0.0003 wt % to about 10 wt %, or from about 0.005 wt % to about 5 wt %, with respect to the weight of the polymeric particles.

The fusing agent can also include an endothermic decomposition compound. The endothermic decomposition compound can include a compound that absorbs heat and undergoes thermal decomposition at a temperature ranging from about 60° C. to about 400° C. In yet other examples, the endothermic decomposition composition can undergo thermal decomposition at a temperature that can range from about 90° C. to about 300° C. Thermal decomposition, as used herein, refers to a chemical breakdown of a substance that can be caused by heat.

The endothermic decomposition compound may be any suitable substance that can absorb heat and decompose at a temperature ranging from about 60° C. to about 400° C. Example decomposition compounds can include urea, ammonium nitrate, ammonium chloride, calcium carbonate, copper (II) sulfate, copper (II) sulfate pentahydrate, or an admixture thereof. In an example, the endothermic decomposition compound can include urea. Urea and its by-products biuret, cyanuric acid, isocyanic acid, ammelide, ammeline, and melamine can undergo a series of decompositions at temperatures ranging from room temperature to temperatures above 360° C. In another example, the endothermic decomposition compound can include ammonium nitrate and the ammonium nitrate can decompose at a temperature of about 300° C. In yet another example, the endothermic decomposition compound can include ammonium chloride and the ammonium chloride can decompose at a temperature of about 337° C. In other examples, the endothermic decomposition compound can include copper (II) sulfate pentahydrate. Copper (II) sulfate pentahydrate and its by-products can undergo a series of dehydration decompositions at temperatures ranging from about 63° C. to about 200° C.

The endothermic decomposition compound can be present in the fusing agent at from about 1 wt % to about 50 wt %. In other examples, a concentration of endothermic decomposition compound in the fusing agent can be from about 1 wt % to about 30 wt %, from about 5 wt % to about 20 wt %, from about 20 wt % to about 40 wt %, from about 30 wt % to about 50 wt %, or from about 15 wt % to about 45 wt %.

The endothermic decomposition compound can be used to absorb heat during three-dimensional printing. The heat absorption can permit a structural modification to a three-dimensional object formed during printing. The greater the amount of the endothermic decomposition compound in the fusing agent and applied to the polymer build material, the greater an extent of the structural modification can be. The structural modification may be associated with the reduction of heat to the polymer build material, a formation of pores, or a combination thereof.

Other Fluid Agents

In some examples, the three-dimensional printing kit, system for three-dimensional printing, or method of three-dimensional printing can further include other fluid agents, such as endothermic fluid agent, detailing agent, coloring agent(s), or the like. For example, if included, the endothermic fluid agent can include an endothermic decomposition compound and an aqueous liquid vehicle. For example, an endothermic fluid agent can include an endothermic decomposition compound and water. In another example, the endothermic fluid agent can include an endothermic decomposition compound, water, and an organic co-solvent. The endothermic decomposition compound can include any of the endothermic decomposition compounds previously described. The endothermic decomposition compound can be the same or different from the endothermic decomposition compound in the fusing agent. The endothermic decomposition compound can be present in the endothermic fluid agent at from about 1 wt % to about 50 wt %, from about 1 wt % to about 30 wt %, from about 25 wt % to about 50 wt %, from about 1 wt % to about 20 wt %, or from about 15 wt % to about 30 wt %. The aqueous liquid vehicle can provide the balance of the formulation, for example.

The endothermic fluid agent can be selectively applied to the polymer build material to allow for an increased structural change in selected areas of the three-dimensional printed object formed. For example, an endothermic fluid agent can be applied to increase an elasticity of the three-dimensional printed object formed. An amount of the increase in elasticity can vary depending on the type of polymeric particles in the polymer build material, the type of endothermic compound, and the amount of endothermic compound applied in the area. In some examples, an increase in elasticity, beyond an elasticity of a comparable part formed without the endothermic decomposition compound, can exhibit an increase of from about 10% to about 300%, from about 10% to about 150%, from about 150% to about 300%, or from about 50% to about 150%.

An increase in elasticity can be due to a structural change to the polymer build material. For example, the structural change can include a variation in the high/low hydrogen bonding polymer phases, radius of gyration, lamellar spacing, long period structure of disordered phases, or the like in the three-dimensional object formed. As used herein, relative terms such as change, increase, or decrease, refers to a difference in a three-dimensional object formed with an endothermic fluid agent relative to a three-dimensional object formed with the same polymer build material and the same electromagnetic radiation absorber, at the same ratios, and having the same dimensions without the endothermic decomposition compound.

In some examples, application of the endothermic fluid agent can also affect a porosity of the three-dimensional printed object. An effect on the porosity can depend on the type of the polymeric particles in the polymer build material, a type of the endothermic decomposition compound, and the amount of endothermic decomposition compound applied in the area. Not all combinations of endothermic decomposition compounds and polymeric particles can affect a porosity of three-dimensional printed objects formed, while others may increase the porosity. For example, urea can increase porosity when printed on a polymer build material including polyamide-12 particles, whereas urea may not have an effect on the porosity of a three-dimensional printed object when printed on a polymer build material of polyamide thermoplastic elastomer particles. A porosity of the printed article can thus vary from 0% to about 40% porosity by volume (or 60% to 100% fused particles), from about 0% to about 25% porosity by volume (or about 75% to 100% fused particles), or from about 1% to about 20% porosity by volume (or about 80% to about 99% fused particles).

Also, if included, a detailing agent may include a detailing compound capable of cooling the polymer build material upon application. In some examples, the detailing agent can be printed around the edges of the portion of a polymer build material that was or can be printed with the fusing agent. The detailing agent can increase selectivity between fused and un-fused portions of the polymer build material by reducing a temperature of the polymer build material around an edge of the portion to be fused. The detailing agent can also in some examples be printed in areas where the fusing agent was or can be printed to provide additional cooling when printing a three-dimensional object.

In further detail regarding the detailing agent, the detailing compound can be or can include a solvent that can evaporate at a temperature of the polymer build material supported on the powder bed or build platform. For example, in some cases, the polymer build material in the powder bed can be preheated to a preheat temperature within about 10° C. to about 70° C. of the fusing temperature of the polymer build material. In other examples, the detailing compound can provide cooling as a temperature is brought above the preheat temperature due to application of electromagnetic energy applied to the fusing agent (applied to the polymer build material). Thus, the detailing agent can be a solvent that can evaporate upon contact with the polymer build material at the preheat temperature and/or fusing temperature, thereby cooling the printed portion through evaporative cooling. In certain examples, the detailing agent can be or can include water, organic co-solvent(s), or combinations thereof, as the detailing compound. In some examples, the detailing agent can be substantially devoid of electromagnetic radiation absorbers. That is, in some examples, the detailing agent can be substantially devoid of ingredients that absorb enough energy from the ultraviolet energy source to cause the polymer build material to fuse. In certain examples, the detailing agent can include colorants such as dyes or pigments that do not cause the polymer build material printed with the detailing agent to fuse when exposed to the ultraviolet or HEV energy sources.

If a coloring agent is included, the coloring agent can include a colorant and an aqueous liquid vehicle. A coloring agent may be of particular use for three-dimensional printed objects that are prepared and fused in a way where the inclusion of a coloring agent would provide a visible change or modification of color. If the fusing agent included a carbon black pigment as the electromagnetic radiation absorber, then a coloring agent may not be as useful in cases where the electromagnetic radiation absorber is another fusing agent that does not impart color or only lightly modifies coloration to the three-dimensional printed object, for example.

Aqueous Liquid Vehicles

As used herein, the term "aqueous liquid vehicle" refers to the liquid in the fusing agent and/or other fluid agents that may be present, e.g., detailing agent, endothermic fluid agent, coloring agent, etc. The aqueous liquid vehicle may include water alone or in combination with a variety of additional components. The aqueous liquid vehicle may be water or may include water and organic co-solvent, for example. Examples of components that may be included, in addition to water, may include one or more of organic co-solvent, surfactant, buffer, antimicrobial agent, anti-kogation agent, chelating agent, buffer, etc. In some examples, the aqueous liquid vehicle comprises water and organic co-solvent. In other examples, the aqueous liquid vehicle comprises water, organic co-solvent, and a surfactant. In other examples, the aqueous liquid vehicle comprises water, organic co-solvent, surfactant, and antimicrobial agent. In further examples, the aqueous liquid vehicle comprises water, organic co-solvent, surfactant, antimicrobial agent, and a chelating agent.

The aqueous liquid vehicle can include water that may be deionized, for example. In some examples, water can be present in the fusing agent, the endothermic fluid agent, the detailing agent, or other fluid agent at a weight percentage that can vary from about 30 wt % to about 90 wt %, from about 50 wt % to about 80 wt %, or from about 70 wt % to about 90 wt %.

Some examples of organic co-solvent(s) that may be added to the aqueous liquid vehicle can include ethanol, methanol, propanol, acetone, tetrahydrofuran, hexane, 1-butanol, 2-butanol, tert-butanol, isopropanol, propylene glycol, triethylene glycol, methyl ethyl ketone, dimethylformamide, 1,4-dioxone, acetonitrile, 1,2-butanediol, 1-methyl-2,3-propanediol, 2-pyrrolidone, glycerol, 2-phenoxyethanol, 2-phenylethanol, 3-phenylpropanol, or a combination thereof. In some examples, the co-solvent can include 2-pyrrolidonone. Whether a single co-solvent is included or a combination of co-solvents are included, a total amount of organic co-solvent(s) in the fusing agent, the endothermic fluid agent, the detailing agent, or other fluid agent can range from about 5 wt % to about 50 wt %, from about 10 wt % to about 50 wt %, from about 15 wt % to about 45 wt %, from about 30 wt % to about 50 wt %, from about 5 wt % to about 35 wt %, or from about 5 wt % to about 40 wt %, based on a total weight percentage of the fluid agent.

Examples of surfactants can include a non-ionic surfactant, a cationic surfactant, and/or an anionic surfactant. In some examples, the fluid agent can include an anionic surfactant. In another example, the fluid agent can include a non-ionic surfactant. In still another example, the fluid agent can include a blend of both anionic and non-ionic surfactant. Example non-ionic surfactant that can be used include self-emulsifiable, nonionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA) or an ethoxylated wetting agent and molecular defoamer (e.g., SURFYNOL® 420 from Air Products and Chemical Inc., USA). Still other surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), and oleth-3 phosphate surfactant (e.g., CRODAFOS™ N3 Acid and CRODAFOST O3A both from Croda, UK). Example cationic surfactant(s) that can be used include dodecyltrimethylammonium chloride, hexadecyldimethylammonium chloride, or a combination thereof. In some examples, the surfactant (which may be a blend of multiple surfactants) may be present in the fusing agent, the endothermic fluid agent, the detailing agent, or other fluid agent at an amount ranging from about 0.01 wt % to about 2 wt %, from about 0.05 wt % to about 1.5 wt %, or from about 1 wt % to about 2 wt %.

In some examples, the aqueous liquid vehicle may further include a chelating agent, an antimicrobial agent, a buffer, or a combination thereof. While the amount of these may vary, if present, these can be present in the fusing agent, the endothermic fluid agent, the detailing agent, or other fluid agent at a total amount ranging from about 0.001 wt % to about 20 wt %, from about 0.05 wt % to about 10 wt %, or from about 0.1 wt % to about 5 wt %.

Examples of suitable chelating agents can include disodium ethylene-diaminetetraacetic acid (EDTA-Na), ethylene diamine tetra acetic acid (EDTA), and methyl-glycinediacetic acid (e.g., TRILON® M from BASF Corp., Germany). If included, whether a single chelating agent is used or a combination of chelating agents is used, the total amount of chelating agent(s) in the fusing agent, the detailing agent, or other fluid agent may range from 0.01 wt % to about 2 wt % or from about 0.01 wt % to about 0.5 wt %.

Example antimicrobial agents can include the NUOSEPT® (Ashland Inc., USA), VANCIDE® (R.T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and combinations thereof. In an example, if included, a total amount of antimicrobial agents in the fusing agent, the endothermic fluid agent, the detailing agent, or other fluid agent can range from about 0.01 wt % to about 1 wt %.

In some examples, an aqueous liquid vehicle may further include buffer solution(s). The buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, from about 7 to about 9, or from about 7.5 to about 8.5. In some examples, the buffer solution(s) can include a poly-hydroxy functional amine. In other examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMAR sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N, N,N'N'-tetrakis-(2-hydroxypropyl)-ethylenediamine, beta-alanine, betaine, or mixtures thereof. In yet other examples, the buffer solution(s) can include 2-amino-2-(hydroxymethyl)-1,3-propanediol (TRIZMA® sold by Sigma-Aldrich, USA), beta-alanine, betaine, or mixtures thereof. The buffer solution, if included, can be added to the fusing agent, the endothermic fluid agent, the detailing agent, or other fluid agent at an amount ranging from about 0.01 wt % to about 10 wt %, from about 0.1 wt % to about 7.5 wt %, or from about 0.05 wt % to about 5 wt %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "applying" when referring to fluid agent, such as a fusing agent that may be used, for example, refers to any technology that can be used to put or place the fluid, e.g., fusing agent, on the polymeric build material or into a layer of polymer build material for forming a three-dimensional object. For example, "applying" may refer to a variety of dispensing technologies, including "jetting," "ejecting," "dropping," "spraying," or the like.

As used herein, "jetting" or "ejecting" refers to the expulsion of fluid agents or other compositions from ejection or jetting architecture, such as ink-jet printheads. Such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, "average" when referring to numerical ranges of particle size refers to a number average of the diameter of the particles for spherical particles, or a number average of the volume equivalent sphere diameter for non-spherical particles. The volume equivalent sphere diameter is the diameter of a sphere having the same volume as the particle.

As used herein, a plurality of items, structural elements, compositional elements, and/or materials may be presented in a common list for convenience. However, these lists should be construed as though an individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative compositions, methods, and systems may be devised without departing from the present disclosure. The appended claims are intended to cover such modifications and arrangements.

Example 1—Preparation of Fusing Agents

Two fusing agent formulations were prepared by admixing the respective components as shown in Table 1 below.

TABLE 1

Fusing Agent Formulations

| Component | Fusing Agent ID | |
|---|---|---|
| | Control (wt %) | A (wt %) |
| Carbon Black Pigment (Electromagnetic Radiation Absorber) | 5 | 5 |
| Organic Co-solvent | 27 | 27 |
| Surfactant | 1.2 | 1.2 |
| Antimicrobial Agent | 0.32 | 0.32 |
| Chelating Agent | 0.08 | 0.08 |
| Urea (Endothermic Decomposition Agent) | — | 20 |
| Deionized Water | Balance | Balance |

The above formulations were initially tested for jettability by individually dispensing the formulations as bars printed onto a paper medium using an HP® ink jet printer. The fusing agent formulations did not exhibit any negative effects on decap or nozzle health of the print head.

Example 2—Preparation of Three-Dimensional Objects

In order to test the fusing capability of the fusing agent formulations and heat sink capability of the endothermic decomposition agent therein, several dog bone (or barbell) shaped three-dimensional objects were prepared (Type S2 in accordance with DIN 53504:2009-10) using the fusing agents in Table 1 above. The three-dimensional objects were prepared using both polyamide-12 powder and polyamide thermoplastic elastomer as the polymer build material. The powder bed of the build material was held at an elevated temperature of about 165° C., and the fusing agents were independently printed at a fluid density which corresponded to about 5 wt % of a fusing agent and about 95 wt % polymer build material per layer. The polymer build material with the fusing agent printed thereon was fused by IR lamps for up to a few seconds per layer.

All of the three-dimensional printed objects sufficiently fused to form robust parts following the multilayered exposure to the UV-LED light array. The incorporation of the endothermic decomposition agent did not negatively affect the fusing capability of the electromagnetic radiation absorber. Areas of the polymer build material which were not printed with the fusing agent did not sinter or fuse. After formation, the dog bones were removed from the powder bed for further evaluation.

Example 3—Elongation at Break—Strain Testing

Figure 4:
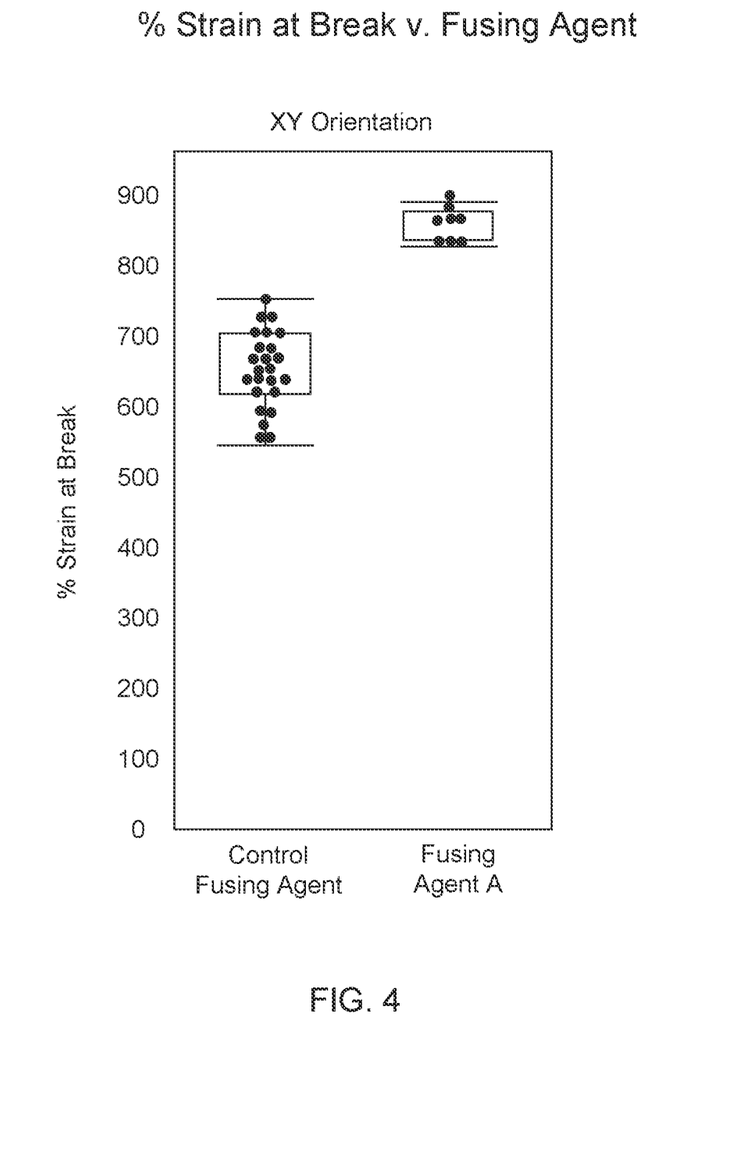
FIG. 4 is a graphic illustration of percent strain at break of three-dimensional printed objects in accordance with the present disclosure.

The three-dimensional printed objects prepared in accordance with Example 2 were analyzed with an INSTRON® tensiometer to evaluate changes in elongation at break in the XY-direction (or the direction parallel with the printed length of the dog bones). Elongation at break provides a good indicator of elasticity. All of the three-dimensional printed objects formed with Fusing Agent A exhibited an increase in elongation at break in the XY-direction or orientation when compared with the three-dimensional printed object formed from the Control Fusing Agent and the same types of polymer build material with both types of polymer build materials (polyamide-12 powder or polyamide thermoplastic elastomer). See FIG. 4. This indicated an increase of elasticity in the three-dimensional printed objects increased when an endothermic decomposition compound was utilized during printing.

Example 4—X-ray Diffraction Evaluation

The three-dimensional printed objects were further analyzed using x-ray diffraction. X-ray diffraction measurements can indicate a change to the structure of the polymer forming the three-dimensional printed objects. The greatest areas of structural change occurred adjacent to the locations of the application of Fusing Agent A, which included the endothermic decomposition compound. Three-dimensional objects formed with the polyamide-12 powder exhibited a modification in high/low hydrogen bonding polymer phases and were porous. Three-dimensional objects formed with the polyamide thermoplastic elastomer powder exhibited an increase in radius of gyration, lamellar spacing, and long period structure of disordered phases and were not porous. Three-dimensional objects prepared using the Control Fusing Agent exhibited a different microstructure consistent with less hydrogen bonding between polymer chains, shorter radius of gyrations and shorter long period parameters relative to treated polymer.

The examples above indicate that an endothermic decomposition agent can be used to structurally modify a three-dimensional printed object formed without negatively impacting fusing.

What is claimed is:

1. A three-dimensional printing kit comprising:
   a polymer build material including from about 80 wt % to 100 wt % polymeric particles; and
   a fusing agent including:
      an aqueous liquid vehicle,
      an electromagnetic radiation absorber to absorb radiation energy and convert the radiation energy to heat, and
      an endothermic decomposition compound that undergoes thermal decomposition at a temperature ranging from about 60° C. to about 400° C.

2. The three-dimensional printing kit of claim 1, wherein the polymer build material includes at least one of polyamide-6, polyamide-8, polyamide-9, polyamide-11, polyamide-12, polyamide-6,6, polyamide-6,12, polyamide-8,12, polyamide thermoplastic elastomer, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, and copolymers thereof.

3. The three-dimensional printing kit of claim 1, wherein the electromagnetic radiation absorber includes at least one of a metal dithiolene complex, carbon black, a near-infrared absorbing dye, a near-infrared absorbing pigment, metal nanoparticles, a conjugated polymer, or a combination thereof.

4. The three-dimensional printing kit of claim 1, wherein the endothermic decomposition compound includes at least one of urea, ammonium nitrate, ammonium chloride, calcium carbonate, copper (II) sulfate, copper (II) sulfate pentahydrate, or an admixture thereof.

5. The three-dimensional printing kit of claim 1, wherein the endothermic decomposition compound is present at from about 1 wt % to about 50 wt %.

6. The three-dimensional printing kit of claim 1, further comprising a second fluid agent, wherein the second fluid agent is selected from a detailing agent, an endothermic fluid agent, or the combination thereof;

wherein the detailing agent comprises a detailing compound, wherein the detailing compound reduces a temperature of powder bed material onto which the detailing agent is applied;

wherein the endothermic fluid agent comprises an endothermic decomposition agent and an aqueous liquid vehicle and allows for a structural change in a three-dimensional object formed where the endothermic fluid agent is applied.

7. A method of three-dimensional printing comprising:
iteratively applying a polymer build material as individual layers to a powder bed, wherein the polymer build material includes from about 80 wt % to 100 wt % polymeric particles;
based on a three-dimensional object model, selectively applying a fusing agent onto individual layers of the polymer build material, the fusing agent including:
an aqueous liquid vehicle,
an electromagnetic radiation absorber that absorbs radiation energy, and
an endothermic compound that undergoes thermal decomposition at a temperature ranging from about 60° C. to about 400° C.; and
exposing the powder bed to electromagnetic energy to selectively heat and fuse portions of individual layers of the polymer build material together in contact with the fusing agent to form a three dimensional object, wherein the endothermic decomposition compound causes a structural modification of the three-dimensional object in response to the heat.

8. The method of claim 7, wherein the endothermic decomposition compound includes at least one of urea, ammonium nitrate, ammonium chloride, calcium carbonate, copper (II) sulfate, copper (II) sulfate pentahydrate, or an admixture thereof.

9. The method of claim 7, wherein the polymeric particles include at least one of a polyamide, a polypropylene, or a combination thereof, and wherein the structural modification includes a modification in high/low hydrogen bonding polymer phases.

10. The method of claim 7, wherein the polymeric particles include a polyamide thermoplastic elastomer, and wherein the structural modification includes at least one of an increase in radius of gyration, lamellar spacing, long period structure of disordered phases, or a combination thereof.

11. The method of claim 7, wherein the fused three-dimensional object has an increase in elasticity of from about 1.1 times to about 4 times greater than a comparative three-dimensional object formed from the polymer build material and the electromagnetic radiation absorber which excludes the endothermic decomposition compound.

12. The method of claim 7, further comprising selectively jetting a detailing agent onto individual build material layers laterally at a border between a first area where the individual layers of the polymer build material is contacted by the fusing agent and a second area where the individual layers of the polymer build material is not contacted by the fusing agent.

13. A system for three-dimensional printing comprising;
a polymer build material including from about 80 wt % to 100 wt % polymeric particles;
a printhead fluidly coupled to or fluidly coupleable to the fusing agent to selectively and iteratively eject a fusing agent onto successive placed individual layers of the build material, the fusing agent including an aqueous liquid vehicle, an electromagnetic radiation absorber to absorb radiation energy and convert the radiation energy to heat, and an endothermic decomposition compound that undergoes thermal decomposition at a temperature ranging from about 60° C. to about 400° C.; and
an electromagnetic energy source positioned or positionable to expose the individual layers of the build material to radiation energy to selectively fuse the polymeric particles in contact with the electromagnetic radiation absorber to iteratively form a three-dimensional object and cause a structural modification of the three-dimensional object in response to the heat due to the presence of the endothermic decomposition compound.

14. The system of claim 13, wherein the polymer build material includes at least one of a polyamide, polypropylene, a polyamide thermoplastic elastomer, or a combination thereof.

15. The system of claim 13, wherein the endothermic decomposition compound includes at least one of urea, urea, ammonium nitrate, ammonium chloride, calcium carbonate, copper (II) sulfate, copper (II) sulfate pentahydrate, or an admixture thereof.

* * * * *